United States Patent
Ito et al.

(10) Patent No.: US 11,958,462 B2
(45) Date of Patent: Apr. 16, 2024

(54) BRAKE CONTROL APPARATUS

(71) Applicant: Hitachi Astemo, Ltd., Hitachinaka (JP)

(72) Inventors: Takahiro Ito, Tokyo (JP); Kenichiro Matsubara, Hitachinaka (JP); Wataru Yokoyama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 374 days.

(21) Appl. No.: 17/439,533

(22) PCT Filed: Mar. 18, 2020

(86) PCT No.: PCT/JP2020/012136
§ 371 (c)(1),
(2) Date: Sep. 15, 2021

(87) PCT Pub. No.: WO2020/203324
PCT Pub. Date: Oct. 8, 2020

(65) Prior Publication Data
US 2022/0153245 A1 May 19, 2022

(30) Foreign Application Priority Data
Apr. 4, 2019 (JP) ................................ 2019-071900

(51) Int. Cl.
*B60T 8/94* (2006.01)
*B60T 7/04* (2006.01)
(Continued)

(52) U.S. Cl.
CPC .......... *B60T 8/17616* (2013.01); *B60T 7/042* (2013.01); *B60T 7/22* (2013.01); *B60T 8/92* (2013.01);
(Continued)

(58) Field of Classification Search
CPC ........ B60T 7/042; B60T 8/17616; B60T 8/92; B60T 8/94; B60T 8/96; B60T 13/146; B60T 17/18
(Continued)

(56) References Cited

U.S. PATENT DOCUMENTS

| | | | |
|---|---|---|---|
| 5,505,532 A | 4/1996 | Tozu et al. | |
| 5,868,473 A * | 2/1999 | Kato | B60T 8/885 303/169 |

(Continued)

FOREIGN PATENT DOCUMENTS

| | | |
|---|---|---|
| CN | 1778598 A | 5/2006 |
| CN | 102211571 A | 10/2011 |

(Continued)

OTHER PUBLICATIONS

International Search Report with English translation and Written Opinion issued in corresponding application No. PCT/JP2020/012136 dated Jun. 16, 2020.
(Continued)

*Primary Examiner* — Erick R Solis
(74) *Attorney, Agent, or Firm* — Foley & Lardner LLP (57) ABSTRACT

An object of the present invention is to provide a brake control apparatus including a backup brake, which brake control apparatus makes it possible both to ensure deceleration, and to attain vehicle running stability.
The present invention includes: a front-wheel-side braking mechanism 4 that includes a front-wheel-side electric hydraulic mechanism 6, and a hydraulic circuit system, and applies braking force to front wheels 2L, and 2R; a rear-wheel-side braking mechanism 5 that applies braking on a rear wheel side; a backup brake that is actuated in accordance with a switch to the hydraulic circuit system 15 when the front-wheel-side electric hydraulic mechanism 6 fails, (Continued)

and applies braking force to the front wheels 2R, and 2L; and a skid determination threshold setting section 43 that sets a skid determination threshold. When the backup brake is actuated, the skid determination threshold setting section 43 sets the skid determination threshold for the rear wheels 3L, and 3R on the basis of braking force information of the backup brake.

10 Claims, 10 Drawing Sheets

(51) Int. Cl.
    *B60T 7/22*     (2006.01)
    *B60T 8/1761*     (2006.01)
    *B60T 8/92*     (2006.01)
    *B60T 8/96*     (2006.01)
    *B60T 13/14*     (2006.01)
    *B60T 17/18*     (2006.01)

(52) U.S. Cl.
    CPC .............. *B60T 8/96* (2013.01); *B60T 13/146* (2013.01); *B60T 17/18* (2013.01); *B60T 2270/402* (2013.01)

(58) Field of Classification Search
    USPC ...................................... 701/71, 76
    See application file for complete search history.

(56) References Cited

U.S. PATENT DOCUMENTS

| | | | |
|---|---|---|---|
| 10,377,361 | B2 * | 8/2019 | Blattert .................. B60T 7/042 |
| 2010/0062897 | A1 | 3/2010 | Nishino et al. |
| 2011/0241419 | A1 | 10/2011 | Ohkubo et al. |
| 2016/0016568 | A1 | 1/2016 | Ishida et al. |
| 2018/0029577 | A1 * | 2/2018 | Beauvais ................ B60T 8/176 |

FOREIGN PATENT DOCUMENTS

| | | |
|---|---|---|
| JP | H05-085336 A | 4/1993 |
| JP | H06-227384 A | 8/1994 |
| JP | 2004-268849 A | 9/2004 |
| JP | 2010-064652 A | 3/2010 |
| WO | WO-2014/136891 A1 | 9/2014 |

OTHER PUBLICATIONS

Office Action issued in corresponding Chinese Patent Application No. 202080019639.8, with English Machine Translation dated Sep. 18, 2023 (14 pages).

* cited by examiner

BRAKE CONTROL APPARATUS

TECHNICAL FIELD

The present invention relates to a brake control apparatus mounted on a vehicle.

BACKGROUND ART

In a braking apparatus mounted on a vehicle, front wheels, and rear wheels of the vehicle are connected by lines of different systems. Conventionally, if braking systems of the front wheels, and the rear wheels are operating normally, brake fluid pressures of both the left and right rear wheels are controlled simultaneously by using, as a reference wheel, either one of the left and right wheels on the side which is likely to be locked. In addition, in a case that a defect occurs in the braking system of the front wheels, braking force of the rear wheels is increased such that control is performed in accordance with either wheel in the left and right rear wheels which is not exhibiting the tendency of being locked. As such a technology, for example, the technology described in Patent Literature 1 is proposed.

CITATION LIST

Patent Literature

Patent Literature 1: Japanese Unexamined Patent Application Publication No. H6-227384

SUMMARY OF INVENTION

Technical Problem

Meanwhile, there is a braking apparatus in which an electric hydraulic mechanism is used on a front wheel side, and an electric mechanism is used on a rear wheel side unlike a braking apparatus like the one described in Patent Literature 1 in which front wheels, and rear wheels are connected by lines of different systems. In such an apparatus, a mechanical connection by a fluid pressure between a brake pedal and the electric hydraulic mechanism on the front wheel side including a pump, and a valve is disconnected at the time of normal operation by closing the valve linking the hydraulic mechanism and the brake pedal. In this case, the electric hydraulic mechanism on the front wheel side, and the electric mechanism on the rear wheel side are controlled on the basis of control amounts such as required braking force computed on the basis of the stroke of the brake pedal or treading force sensor signal, or required braking force from a vehicle control apparatus provided as a superior apparatus of the brake control apparatus.

In addition, in a case that the electric hydraulic mechanism of the front wheels malfunctions, the valve in the hydraulic mechanism is opened to directly connect a brake caliper located on the front wheel side, and the brake pedal by the fluid pressure. At this time, brake braking force which is according to pedal manipulation by a driver, and unassisted by the electric mechanism is generated to the front wheels, and plays a role as a backup brake when the electric-mechanism portion in the electric hydraulic mechanism malfunctions. In a case that the control functionality of the electric mechanism on the rear wheel side is remaining active at this time, braking force of the rear wheels is controlled on the basis of the amount of pedal manipulation by the driver.

In the technology described in Patent Literature 1, a control method of a braking apparatus including a backup brake that is actuated when the functionality of the braking apparatus partially malfunctions is not taken into consideration. Because, in Patent Literature 1, in a case that a defect occurs in the braking system of the front wheels, braking force of the rear wheels is increased such that control is performed in accordance with either wheel in the left and right rear wheels which is not exhibiting the tendency of being locked, there is a possibility that the rear wheels are locked, and the running stability of the vehicle deteriorates.

An object of the present invention is to provide a brake control apparatus including a backup brake that is actuated when the functionality of a braking apparatus partially malfunctions, which brake control apparatus makes it possible both to ensure deceleration, and to attain vehicle running stability.

Solution to Problem

In order to solve the problems described above, the present invention provides a brake control apparatus that controls braking force on front wheels, and rear wheels of a vehicle, the brake control apparatus including: a backup brake that is provided to at least either the front wheels or the rear wheels, and is actuated in accordance with a switch to a second system when a brake mechanism of a first system fails; and a skid determination threshold setting section that sets a skid determination threshold, in which when the backup brake is actuated, the skid determination threshold setting section sets the skid determination threshold on a basis of braking force information of the backup brake.

Advantageous Effects of Invention

According to the present invention, it is possible to provide a brake control apparatus including a backup brake, which brake control apparatus makes it possible both to ensure deceleration, and to attain vehicle running stability.

DESCRIPTION OF EMBODIMENTS

Hereinafter, embodiments of the present invention are explained in detail by using the figures. Note that identical configurations in the figures are given identical reference signs, and detailed explanations of the overlapping portions are omitted. In addition, the present invention is not limited to the following embodiments, and the scope of the technological concept of the present invention includes even various modification examples, and application examples.

First Embodiment

Figure 1:
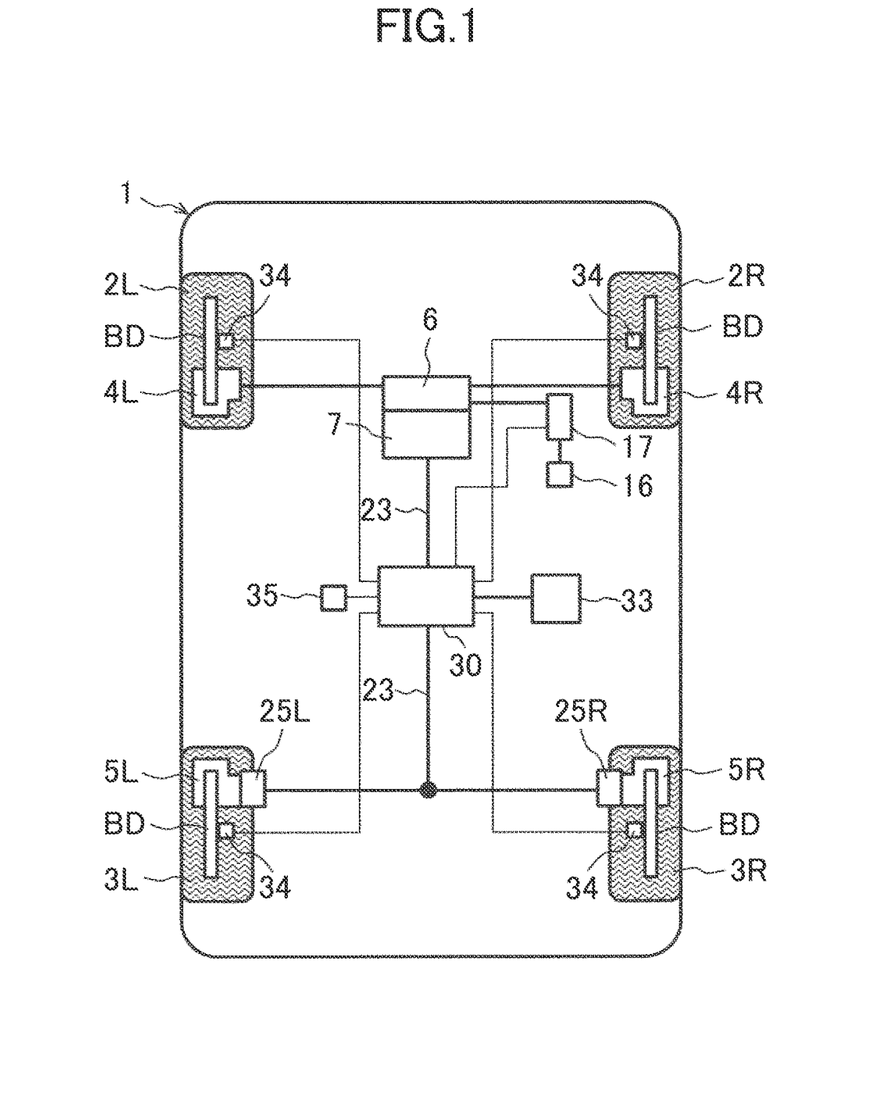
FIG. 1 is a figure depicting the schematic configuration of a braking apparatus of a vehicle according to a first embodiment of the present invention.
Figure 2:
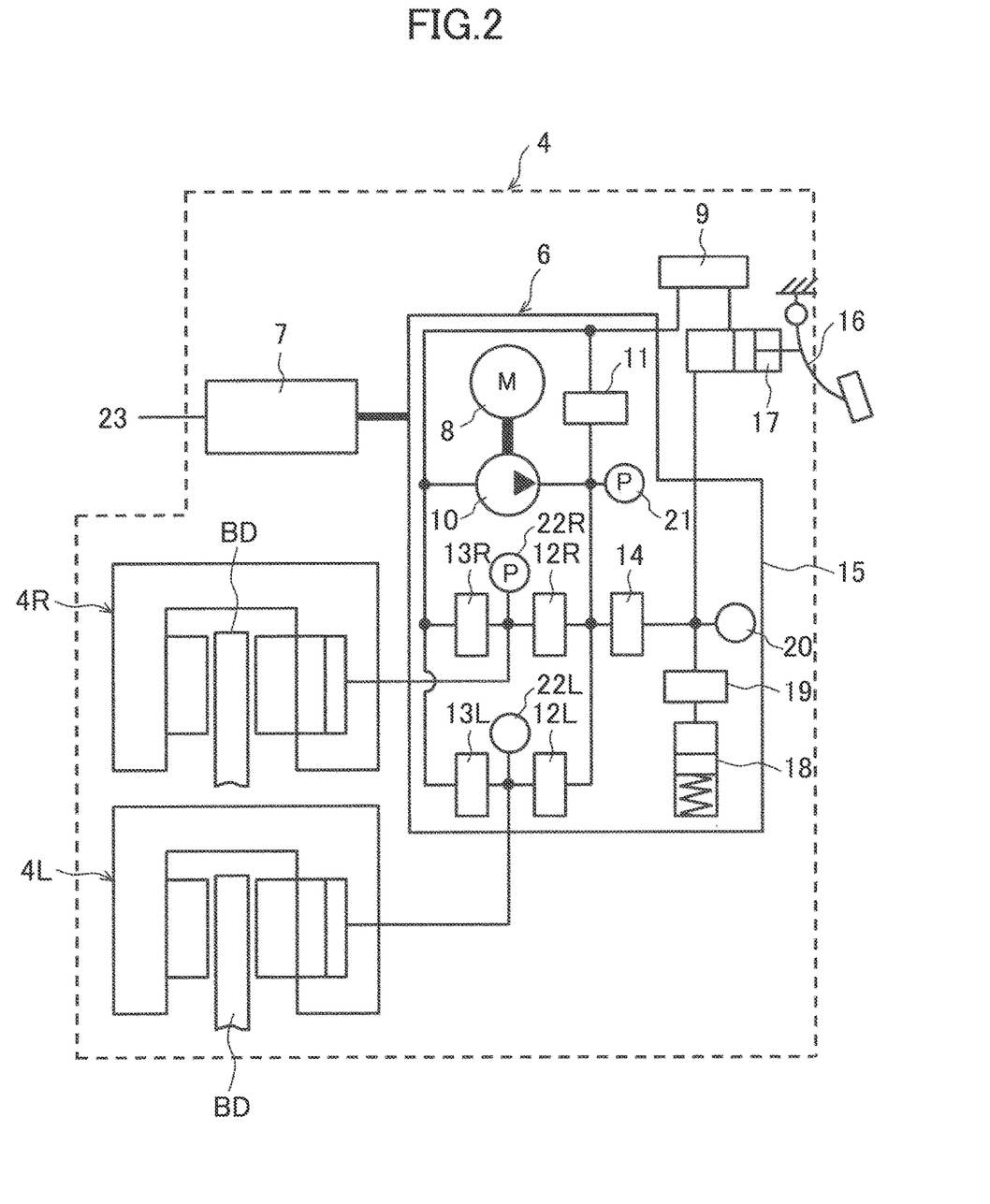
FIG. 2 is a figure depicting the schematic configuration of a front-wheel-side braking mechanism of the braking apparatus in FIG. 1.
Figure 3:
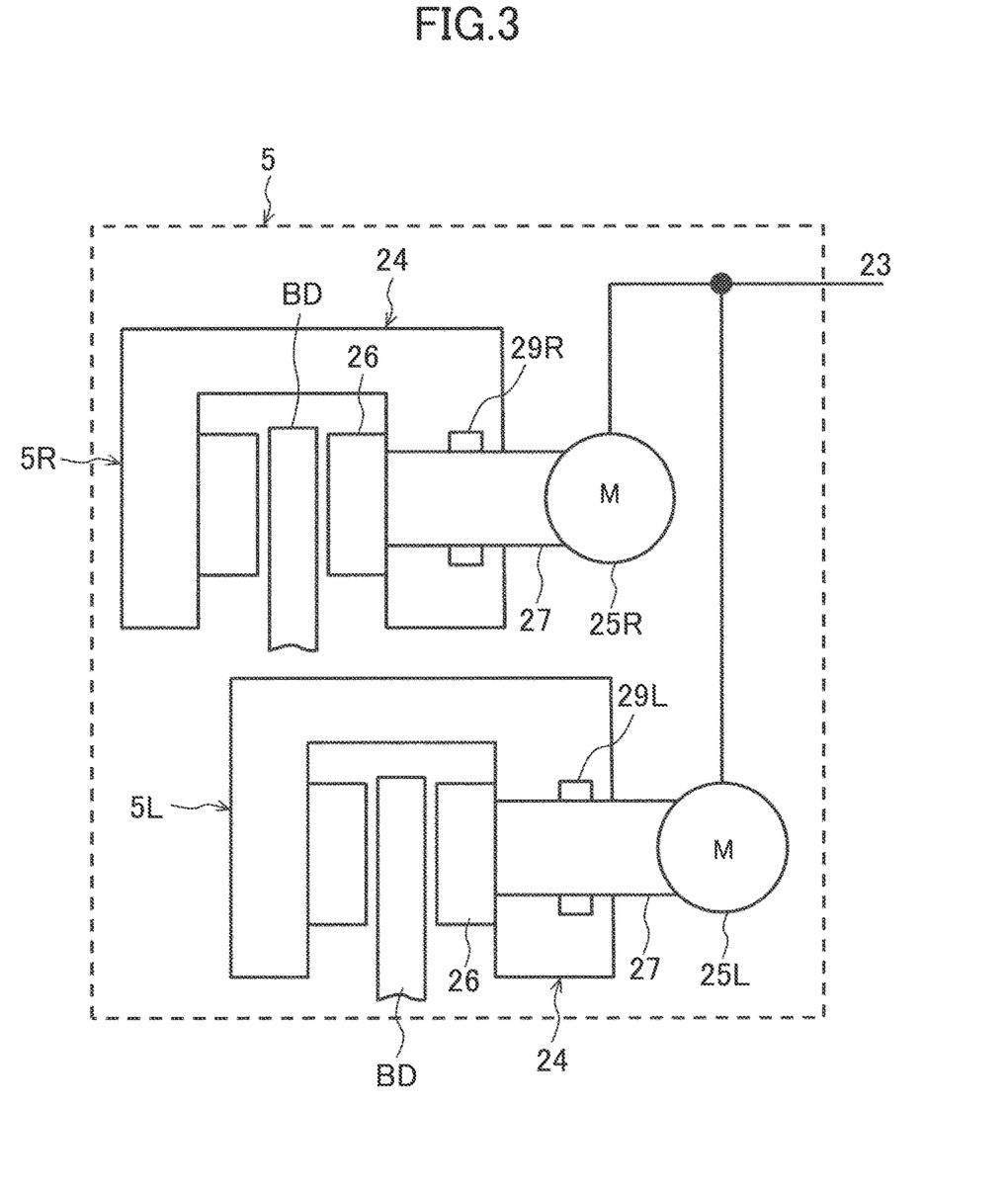
FIG. 3 is a figure depicting the schematic configuration of a rear-wheel-side braking mechanism of the braking apparatus in FIG. 1.
Figure 4:
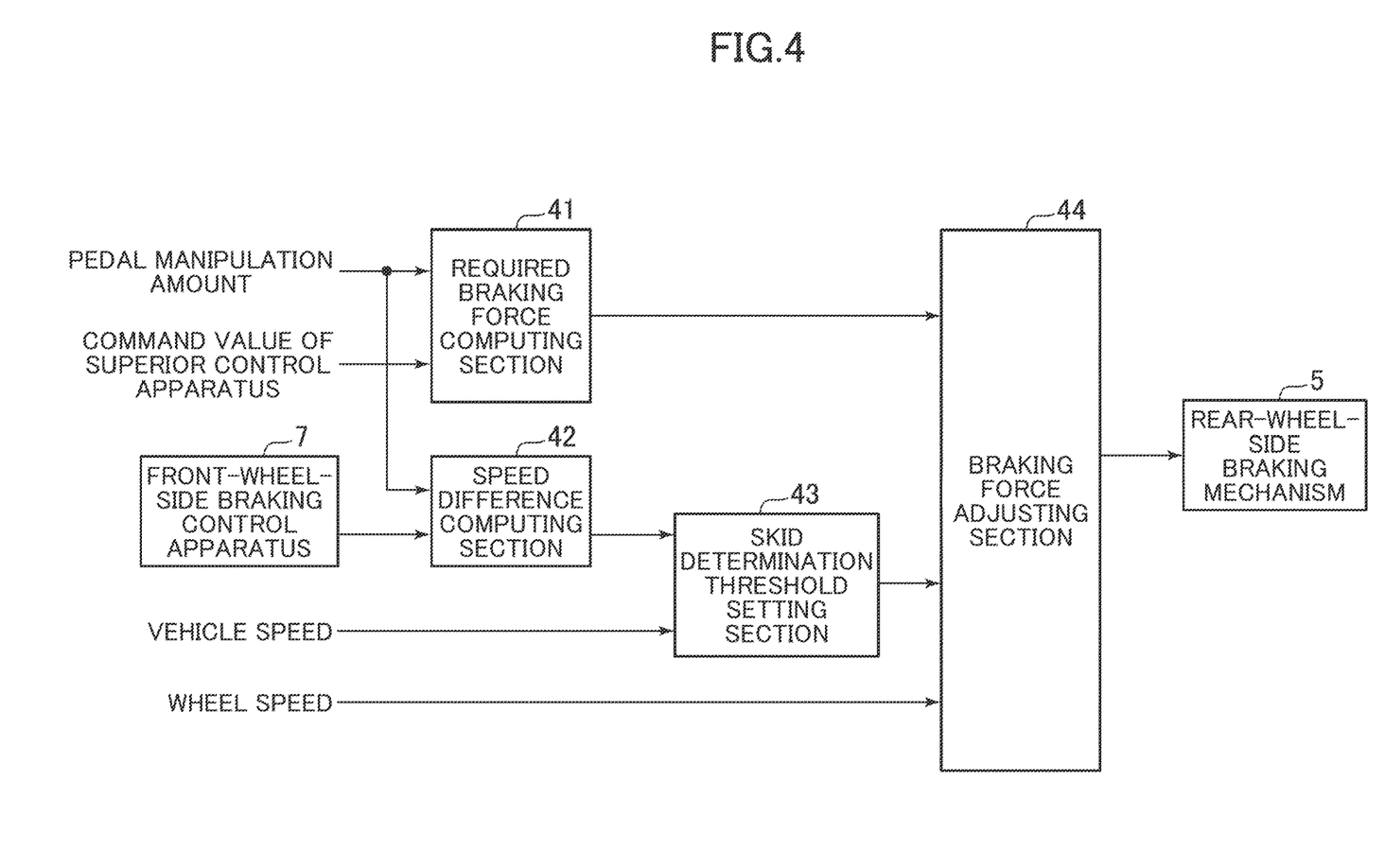
FIG. 4 is a block diagram depicting control executed by the brake control apparatus according to the first embodiment of the present invention.
Figure 5:
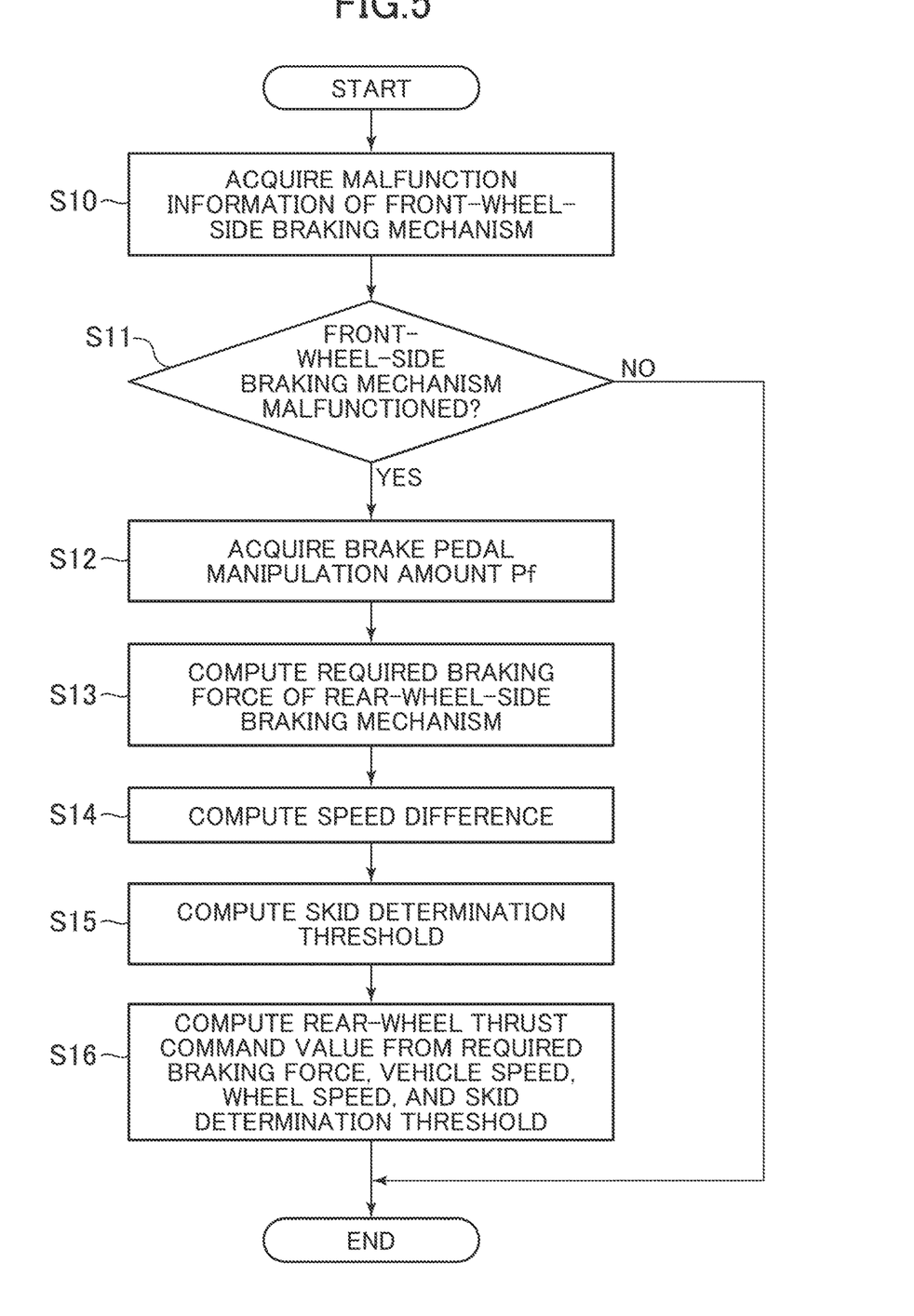
FIG. 5 is a flowchart depicting a control method of the braking apparatus according to the first embodiment of the present invention.
Figure 6:
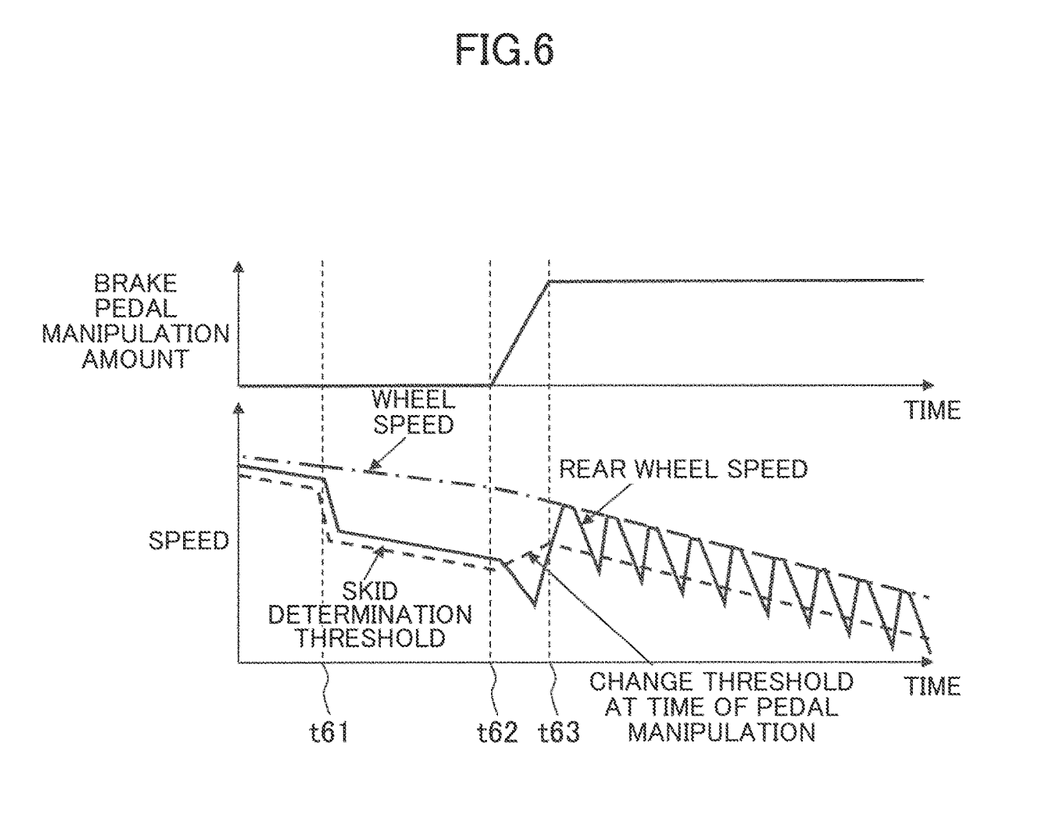
FIG. 6 is a figure depicting the relationship between brake pedal manipulation and a vehicle speed, a wheel speed, and a skid determination threshold at the time of braking by the control method depicted in FIG. 5.

With reference to FIG. 1 to FIG. 6, a brake system of a vehicle according to a first embodiment of the present invention, and a control method thereof are explained. FIG. 1 is a figure depicting the schematic configuration of a braking apparatus of a vehicle according to a first embodiment of the present invention, and FIG. 2, and FIG. 3 depict the schematic configuration of braking mechanisms on a front wheel side, and a rear wheel side in FIG. 1. FIG. 4 is a block diagram depicting control executed by a brake control apparatus 30 according to the first embodiment of the present invention, and FIG. 5 is a flowchart depicting a control flow thereof. FIG. 6 depicts the relationship between changes in a manipulation amount of a brake pedal 16 and a vehicle speed, a rear wheel speed, and a skid determination threshold according to the control method depicted in FIG. 5.

In FIG. 1, a vehicle 1 includes a pair of front wheels 2R, and 2L, and a pair of rear wheels 3R, and 3L, and also includes a front-wheel-side braking mechanism 4 (see FIG. 2) that applies braking force to the front wheels 2R, and 2L, and a rear-wheel-side braking mechanism 5 (see FIG. 3) that applies braking force to the rear wheels 3R, and 3L.

In the first embodiment, the front-wheel-side braking mechanism 4 includes hydraulic disc brakes (hydraulic brake mechanisms) 4R, and 4L that are operated by brake fluid pressures, and sandwich brake discs BD, a front-wheel-side electric hydraulic mechanism 6 that generates the brake fluid pressures, and a front-wheel-side braking control apparatus 7.

In addition, the rear-wheel-side braking mechanism 5 includes electric disc brakes (electric brake mechanisms) 5R, and 5L that are operated by rotation of electric motors for braking 25R, and 25L, and sandwich brake discs BD, and the electric motors for braking 25R, and 25L.

Furthermore, the brake control apparatus 30 that controls the front-wheel-side braking control apparatus 7, and the electric motors for braking 25R, and 25L, and adjusts braking force that is generated by the vehicle 1 is included.

For example, as depicted in FIG. 2, the front-wheel-side electric hydraulic mechanism 6 includes a hydraulic circuit system 15 including electric component elements such as: a hydraulic pump 10 that is driven by an electric motor for pump 8 which is an electric component element, and is a fluid pressure source that pressurizes a brake fluid in a reservoir tank 9; an electromagnetic pressure control valve 11 that adjusts the brake fluid pressure of the hydraulic pump 10; electromagnetic inflow valves 12R, and 12L that adjust a brake fluid flowing into the hydraulic disc brakes 4R, and 4L; electromagnetic outflow valves 13R, and 13L that adjust the brake fluid flowing out; and an electromagnetic shutoff valve 14 that shuts off the side of the brake pedal 16. Note that in FIG. 2 depicting the first embodiment, the front-wheel-side electric hydraulic mechanism 6, and the hydraulic circuit system 15 which are an electric hydraulic system are surrounded by the same frame.

Furthermore, separately from the front-wheel-side electric hydraulic mechanism 6, the front-wheel-side braking mechanism 4 depicted in FIG. 2 has a master cylinder 17 that is operated by, as the motive power source, manipulation of the brake pedal 16 manipulated by a driver. The master cylinder 17 is connected with the hydraulic disc brakes 4R, and 4L by the hydraulic circuit system 15, and is capable of operating the hydraulic disc brakes 4R, and 4L by a brake fluid pressure generated in the master cylinder 17, and braking the vehicle 1, by making the electromagnetic shutoff valve 14, and the electromagnetic inflow valves 12R, and 12L opened, and making the electromagnetic outflow valves 13R, and 13L closed.

In addition, a master cylinder pressure sensor 20 is attached at a middle portion of the hydraulic circuit system 15, a pump pressure sensor 21 is attached on the discharge side of the hydraulic pump 10, and caliper pressure sensors 22R, and 22L are attached at middle portions of a hydraulic circuit that are connected to the hydraulic disc brakes 4R, and 4L. Thereby, fluid pressures of those portions in the hydraulic circuit can be sensed.

In addition, the hydraulic circuit system 15 includes a stroke simulator 18 for applying, to a driver, appropriate reaction force in response to manipulation of the brake pedal 16 at the time when the electromagnetic shutoff valve 14 is closed, and for absorbing a brake fluid pressure discharged from the master cylinder 17.

Furthermore, in a line in the hydraulic circuit system 15 that is connected to the stroke simulator 18, an electromagnetic stroke simulator valve 19 that adjusts a brake fluid flowing into, and flowing out of the stroke simulator 18 is included also.

In the front-wheel-side braking mechanism 4, the electric motor for pump 8, which is an electric component element, and the electromagnetic pressure control valve 11, the electromagnetic inflow valves 12R, and 12L, the electromagnetic outflow valves 13R, and 13L, the electromagnetic shutoff valve 14, and the electromagnetic stroke simulator valve 19, which function as electromagnetic fluid pressure control valves, are controlled by the front-wheel-side braking control apparatus 7.

The front-wheel-side braking control apparatus 7 is connected with a control signal line 23. The control signal line 23 play a role of inputting, to the front-wheel-side braking control apparatus 7, control command information such as fluid pressure command values for individual wheels from the brake control apparatus 30 (see FIG. 1), and outputting, to the brake control apparatus 30, driving state information such as a current value of the electric motor for pump 8 of the front-wheel-side braking mechanism 4, or pressures of individual sections in the hydraulic circuit.

In addition, the rear-wheel-side braking mechanism 5 includes the electric disc brakes 5R, and 5L in the first embodiment. Here, the electric disc brake 5R, and 5L have the same configuration. For example, as depicted in FIG. 3, rear-wheel-side electric mechanisms 24 generate pressing force, and generate braking force by pressing brake pads 26 against the brake discs BD by using the electric motors for braking 25R, and 25L. Rotational force of the electric motors for braking 25R, and 25L is converted into linear motions by rotation/linear motion conversion mechanisms 27, and the brake pads 26 are pressed against the brake discs BD to apply the braking force. Here, for example, feed screw mechanisms are employed for the rotation/linear motion conversion mechanisms 27, and the rotation/linear motion conversion mechanisms 27 convert rotary motions into linear motions.

In addition, the rear-wheel-side electric mechanisms 24 include thrust sensors 29R, and 29L, and on the basis of pressing force sensed at the thrust sensors 29R, and 29L, the brake control apparatus 30 controls rotation of the electric motors for braking 25R, and 25L, and adjusts pressing force of the brake pads 26. The rear-wheel-side electric mechanisms 24, and the brake control apparatus 30 are connected by the control signal line 23.

Furthermore, the control signal line 23 plays a role of inputting control command information from the brake control apparatus 30 to the electric motors for braking 25R, and 25L, and outputting driving state information such as pressing force of the rear-wheel-side braking mechanism 5 or current values of the electric motors for braking 25R, and 25L to the brake control apparatus 30.

Returning to FIG. 1, a manipulation amount (the stroke of, or treading force on the brake pedal, etc.) of the brake pedal 16 is transmitted to the brake control apparatus 30 as braking force information. In addition, wheel rotation speed sensors 34 are attached to the front wheels 2R, and 2L, and the rear wheels 3R, and 3L of the vehicle 1, and transmit wheel speed information to the brake control apparatus 30. In addition, a vehicle motion sensor 35 also senses vehicle behavior information such as acceleration or a yaw rate of the vehicle 1, and transmits it to the brake control apparatus 30.

In addition to this, the vehicle 1 includes a superior control apparatus 33. On the basis of one or more pieces of information such as external environment information from a camera, a radar or the like, map information from a navigation system, operation state information about a driving apparatus, a steering apparatus, a braking apparatus or the like provided to the vehicle 1 or motion state information about the vehicle 1, the superior control apparatus 33 computes an appropriate braking operation amount of the vehicle 1, and transmits the vehicle braking amount to the brake control apparatus 30 as control information. In addition, the superior control apparatus 33 obtains a vehicle speed from a radar or a GPS functionality of a navigation system, and transmits it to the brake control apparatus 30.

On the basis of information about manipulation by a driver obtained from the stroke of the brake pedal 16, the master cylinder pressure sensor 20 or the like, wheel speed information about the front and rear wheels obtained from the wheel rotation speed sensors 34, vehicle behavior information about the vehicle 1 obtained from the vehicle motion sensor 35, and control command information about the superior control apparatus 33, the brake control apparatus 30 mounted on such a vehicle 1 transmits control commands to the front-wheel-side braking control apparatus 7, and the electric motors for braking 25R, and 25L, and controls operation of the front-wheel-side braking mechanism 4, and the rear-wheel-side braking mechanism 5.

In the case of the first embodiment, at the time of normal control, the front-wheel-side braking mechanism 4 closes the electromagnetic shutoff valve 14 to thereby shut off the connection between the master cylinder 17 and the hydraulic disc brakes 4R, and 4L, and opens the electromagnetic stroke simulator valve 19 to absorb a brake fluid pressure discharged by manipulation of the brake pedal 16 by a driver.

Simultaneously, on the basis of manipulation information about the brake pedal 16, wheel speed information, and vehicle behavior information about the vehicle 1, control command information about the superior control apparatus 33, operation state information about the electric disc brakes 5R, and 5L on the side of the rear wheels 3R, and 3L, and the like, the brake control apparatus 30 computes control amounts corresponding to braking force to be generated at the front wheels 2R, and 2L, and the rear wheels 3R, and 3L, and transmits them to the front-wheel-side braking control apparatus 7, and the electric motors for braking 25R, and 25L.

Then, on the basis of control amount command values of the brake control apparatus 30, the front-wheel-side braking control apparatus 7 of the front-wheel-side braking mechanism 4 controls operation of the electric motor for pump 8, the electromagnetic pressure control valve 11, the electromagnetic inflow valves 12R, and 12L, and the electromagnetic outflow valves 13R, and 13L, and generates braking force at the hydraulic disc brakes 4R, and 4L.

On the other hand, on the basis of control amount command values of the brake control apparatus 30, the rear-wheel-side braking mechanism 5 controls operation of the electric motors for braking 25R, and 25L, and adjusts braking force of the electric disc brakes 5R, and 5L.

Next, operation in a case that the front-wheel-side braking mechanism 4 partially malfunctions in the braking apparatus is explained. In a case that the front-wheel-side braking mechanism 4 partially malfunctions, the mode transitions to a backup brake mode by making a response of shutting off a relay provided to the front-wheel-side braking control apparatus 7 or by making another response. In the backup brake mode, the electromagnetic shutoff valve 14, and the electromagnetic inflow valves 12R, and 12L are opened, and the electromagnetic outflow valves 13R, and 13L are closed to thereby enable direct manipulation of the hydraulic disc brakes 4R, and 4L in accordance with treading force of a driver who manipulates the brake pedal 16. That is, the backup brake is actuated in accordance with a switch to a second system when a brake mechanism of a first system fails.

In order to transition to the backup brake mode immediately at the time of a malfunction, in the first embodiment, valves that become opened when not supplied with a current are used as the electromagnetic shutoff valve 14, and the electromagnetic inflow valves 12R, and 12L, and valves that become closed when not supplied with a current are used as the electromagnetic outflow valves 13R, and 13L. In a case that the front-wheel-side braking mechanism 4 partially malfunctions also, in a case that the rear-wheel-side braking mechanism 5 is operating normally, on the basis of information about manipulation of the brake pedal 16 by a driver, and control information about the superior control apparatus 33, the brake control apparatus 30 controls the rear-wheel-side braking mechanism 5, and causes the electric disc brakes 5R, and 5L to generate braking force.

Control to be performed by the brake control apparatus 30 in accordance with the manipulation state of the backup brake in a case that the front-wheel-side braking mechanism 4 malfunctions in the braking apparatus that performs operation like the one above is explained on the basis of the control block diagram in FIG. 4, and the control flow in FIG. 5. FIG. 4 is an example of a diagram of control blocks mounted in the brake control apparatus 30 for realizing control executed when the front-wheel-side braking mechanism 4 in the first embodiment partially malfunctions. In addition, FIG. 5 is a figure of the flow of control to be performed by the brake control apparatus 30 when the front-wheel-side braking mechanism 4 malfunctions, and it is assumed that the control flow is activated every time a predetermined length of time elapses.

[Step S10] First, at Step S10, the brake control apparatus 30 acquires malfunction information about the front-wheel-side braking mechanism 4. For example, on the basis of a response to an inspection signal from the brake control apparatus 30, error information from the front-wheel-side braking control apparatus 7, or the like, the brake control apparatus 30 acquires the malfunction information about the front-wheel-side braking mechanism 4. Thereafter, the process proceeds to Step S11.

[Step S11] Next, at Step S11, the brake control apparatus 30 decides whether there is a malfunction of the front-wheel-side braking mechanism 4. In a case that it is decided that there is a malfunction, the relay of the front-wheel-side braking control apparatus 7 is shut off, and the front-wheel-side braking mechanism enters the backup brake mode. In a case that there are no malfunctions, this flow ends, and in a case that there is a malfunction, the process proceeds to Step S12.

[Step S12] Next, at Step S12, the brake control apparatus 30 acquires a manipulation amount Pf of the brake pedal. The manipulation amount of the brake pedal may be the pedal stroke, pedal treading force or the like, for example. Thereafter, the process proceeds to Step S13.

[Step S13] Next, at Step S13, on the basis of the manipulation amount Pf of the brake pedal or a command value Ft of the superior control apparatus 33, a required braking force computing section 41 of the brake control apparatus 30 computes required braking force Fr that the rear-wheel-side braking mechanism 5 is required to generate. Here, Fr is a value determined in accordance with a function like Fr=f1 (Pf) on the basis of the brake pedal manipulation amount or computed in accordance with a function like Fr=f2 (Ft) on the basis of the command value of the superior control apparatus 33. Thereafter, the process proceeds to Step S14.

[Step S14] Next, at Step S14, a speed difference computing section 42 of the brake control apparatus 30 computes a speed difference $\Delta v$ from a vehicle speed (body speed) obtained via the front-wheel-side braking control apparatus 7, and the manipulation amount Pf of the brake pedal. The speed difference $\Delta v$ represents the difference between the vehicle speed (body speed) and a skid determination threshold vth. Here, the speed difference $\Delta v$ is a value determined in accordance with the function $\Delta v = g$ (Pf). For example, the function g may be a function that gives the largest speed difference $\Delta v$ when Pf=0, and gives smaller $\Delta v$ as Pf increases. The speed difference $\Delta v$ is a value computed in accordance with the manipulation amount of the brake pedal. Thereafter, the process proceeds to Step S15.

[Step S15] Next, at Step S15, a skid determination threshold setting section 43 of the brake control apparatus 30 computes the skid determination threshold vth. The skid determination threshold vth may be determined like vth=vcar−$\Delta v$ by using the vehicle speed vcar, and the speed difference $\Delta v$. The skid determination threshold vth is a value smaller than the vehicle speed vcar by a value according to the manipulation amount of the brake pedal. For example, the vehicle speed vcar may be determined from the wheel speeds of the four wheels. For example, in a case that there is a difference between the wheel speeds of the front wheels, and the rear wheels, a faster wheel speed may be used as the vehicle speed vcar. Alternatively, the vehicle speed vcar may be obtained from a GPS functionality of a navigation system. When the backup brake is actuated, the skid determination threshold setting section 43 sets the skid determination threshold vth on the basis of braking force information about the backup brake.

Thereafter, the process proceeds to Step S16.

[Step S16] Next, at Step S16, a braking force adjusting section 44 of the brake control apparatus 30 computes rear-wheel thrust command values for the electric disc brakes 5R, and 5L of the rear wheels. In a case that the wheel speed of each wheel of the rear wheels exceeds the skid determination threshold vth computed at the skid determination threshold setting section 43, the rear-wheel thrust command values are computed on the basis of the required braking force Fr computed at the required braking force computing section 41. On the other hand, in a case that the wheel speed of each wheel of the rear wheels falls below the skid determination threshold vth, it is determined that the rear wheels are about to skid, and the thrust command values are reduced in order to reduce the braking force.

The manipulation amount of the brake pedal 16, and temporal changes of the vehicle speed, and the wheel speed before and after a failure of the braking apparatus including the brake control apparatus 30 that performs control like the one above are schematically depicted in FIG. 6.

FIG. 6 is a figure depicting the relationship between brake pedal manipulation and a vehicle speed, a wheel speed, and a skid determination threshold at the time of braking by the control method depicted in FIG. 5.

The top figure in FIG. 6 depicts the amount of manipulation of the brake pedal 16 by a driver, and the bottom figure in FIG. 6 depicts temporal changes of the vehicle speed, the rear wheel speed, and the skid determination threshold. Although the rear wheel speed actually should be represented by two lines because there are two rear wheels, only one line is depicted in the first embodiment in order to make it easier to understand contents of the present invention. In addition, in the example explained in the first embodiment, obstacles are detected by cameras or radars, and an automatic brake that automatically brakes wheels in accordance with the vehicle speed, and present or absence of obstacles is mounted on the vehicle.

In the explanation given with reference to FIG. 6, it is supposed that the vehicle 1 at the starting point is in a state where the automatic brake is actuated in accordance with a command from the superior control apparatus 33, and at time t61, the front-wheel-side braking mechanism 4 partially malfunctions. Due to the actuation of the automatic brake, the vehicle speed of the vehicle 1 is decelerated. At the starting point, braking force are applied to all of the front wheels, and the rear wheels of the vehicle 1. If a malfunction occurs at the front-wheel-side braking mechanism at time t61, and the brake control apparatus 30 detects the malfunction at Step S11 (FIG. 5), required braking force of the rear-wheel-side braking mechanism 5 is computed at Step S13 on the basis of the brake pedal manipulation amount Pf acquired at Step S12. Here, due to the malfunction, the front-wheel-side braking mechanism 4 shuts off power supply, the electromagnetic shutoff valve 14, and the electromagnetic inflow valves 12R, and 12L are opened, the electromagnetic outflow valves 13R, and 13L are closed, and the mode transitions to the backup brake operation mode, but there is no longer braking force generated by the front-wheel-side braking mechanism 4 because the driver is not manipulating the brake pedal 16. That is, until the driver manipulates the brake pedal 16, the braking force of only the rear-wheel-side braking mechanism 5 is decelerating the vehicle speed. In view of this, at Step S13, the required braking force of the rear-wheel-side braking mechanism 5 is computed as large force to prevent the deceleration from decreasing. Simultaneously, at Step S14, the speed difference $\Delta v$ between the vehicle speed and the rear wheel speed is computed on the basis of the manipulation amount of the brake pedal 16. Because the brake pedal 16 is not manipulated at the time point of time t61, the speed difference $\Delta v$ is computed as a difference larger than at the time of normal operation. On the basis of the speed difference $\Delta v$, the skid determination threshold setting section 43 computes the skid determination threshold (Step S15). As a result of these computations, the speed difference $\Delta v$ is expanded at time t61, and so the skid determination threshold is set lower than before time t61. Because the required braking force of the rear-wheel-side braking mechanism 5 is set as large force, it is not determined at Step S16 that there is a skid in response to lowering of the rear wheel speed that accompanies generation of large braking force by the rear wheels. Because of this, deceleration larger than normal deceleration is generated by the rear wheels in the zone from time t61 to time t62.

In other words, when the brake mechanism of the first system at the front wheels fails while the automatic brake is actuated, the skid determination threshold setting section 43 sets the skid determination threshold such that the difference from the vehicle speed becomes the largest in a case that the backup brake is not generating braking force. Conversely, the skid determination threshold setting section 43 sets the skid determination threshold such that the difference from the vehicle speed decreases in a case that braking force is generated by the backup brake. In this manner, the skid determination threshold setting section 43 sets the skid determination threshold such that the difference from the vehicle speed is larger in a case that the backup brake is not generating braking force as compared to a case that the backup brake is generating braking force.

At time t62, the driver starts manipulation of the brake pedal 16. When the manipulation of the brake pedal 16 starts braking of the front wheels by the hydraulic circuit system, the load moves toward the front wheel side, and the load on the rear wheel side decreases. As a result, the rear wheel speed decreases significantly. If this state continues, the rear wheels are locked, and the vehicle becomes unstable. In view of this, in the first embodiment, the skid determination threshold is changed in accordance with the manipulation amount of the brake pedal 16 in order to suppress the locking of the rear wheels. The skid determination threshold setting section 43 sets the skid determination threshold such that the difference from the vehicle speed decreases if the braking force generated by the backup brake increases. In this manner, the larger the braking force of the backup brake is, the smaller the difference between the skid determination threshold for the rear wheels and the vehicle speed at the time point when lessening of the braking force of the rear wheels starts is.

On the basis of the brake pedal manipulation amount acquired at Step S12, at Step S13, the required braking force of the rear-wheel-side braking mechanism 5 is computed. It is supposed in FIG. 4 that the driver suddenly performed substantial brake pedal manipulation. At Step S14, the speed difference $\Delta v$ is computed on the basis of the brake pedal manipulation amount. From time t62 to t63, the brake pedal manipulation amount gradually increases, and so the speed difference $\Delta v$ also decreases along with it. Accordingly, the skid determination threshold computed at Step S15 also increases. The skid determination threshold is a value smaller than the vehicle speed by a value according to the manipulation amount of the brake pedal. The skid determination threshold setting section 43 reduces the difference between the vehicle speed and the skid determination threshold if the braking force generated by the backup brake increases. When the brake pedal is trodden on, the deceleration increases due to the braking force generated by the front wheels, and the load moves toward the front wheels.

Accordingly, the upper limit of the braking force that the rear wheels can generate lowers, and the wheel speed of the rear wheels also lowers. When the wheel speed reduction falls below the skid determination threshold, the rear-wheel thrust command value for the electric disc brakes 5R, and 5L of the rear wheels is reduced, and the wheel speed is increased again such that the wheel speed becomes close to the vehicle speed. When the rear wheel speed is increased again, the rear-wheel thrust command value for the electric disc brakes 5R, and 5L of the rear wheels is increased again, and the rear wheel speed decreases along with an increase of the deceleration due to the rear wheels.

At and after time t63, because the brake pedal 16 keeps being manipulated, the skid determination threshold is set higher than in the zone from time t61 to t62 such that the difference between the rear wheel speed and the vehicle speed is prevented from increasing.

The vehicle including the brake control apparatus 30 that performs the process like the one above at the time of a malfunction the front-wheel-side braking mechanism 4 enables braking force control of the rear wheels according to the amount of brake pedal manipulation by the driver. Accordingly, large braking force due to the rear wheels is obtained in a case that there is not brake pedal manipulation by the driver during automatic driving. On the other hand, in a case that there is brake pedal manipulation by the driver, the skid determination threshold is set high, and so even in a case that the driver suddenly manipulates the pedal with large treading force, and the load on the rear wheels decreases due to a sudden increase of the braking force generated at the front wheels also, a skid at the rear wheels does not become significant, and this lowers the possibility that the rear wheels are locked. Accordingly, deterioration of the running stability of the vehicle due to locking of the rear wheels does not occur even if sudden brake pedal manipulation by the driver occurs.

Figure 7:
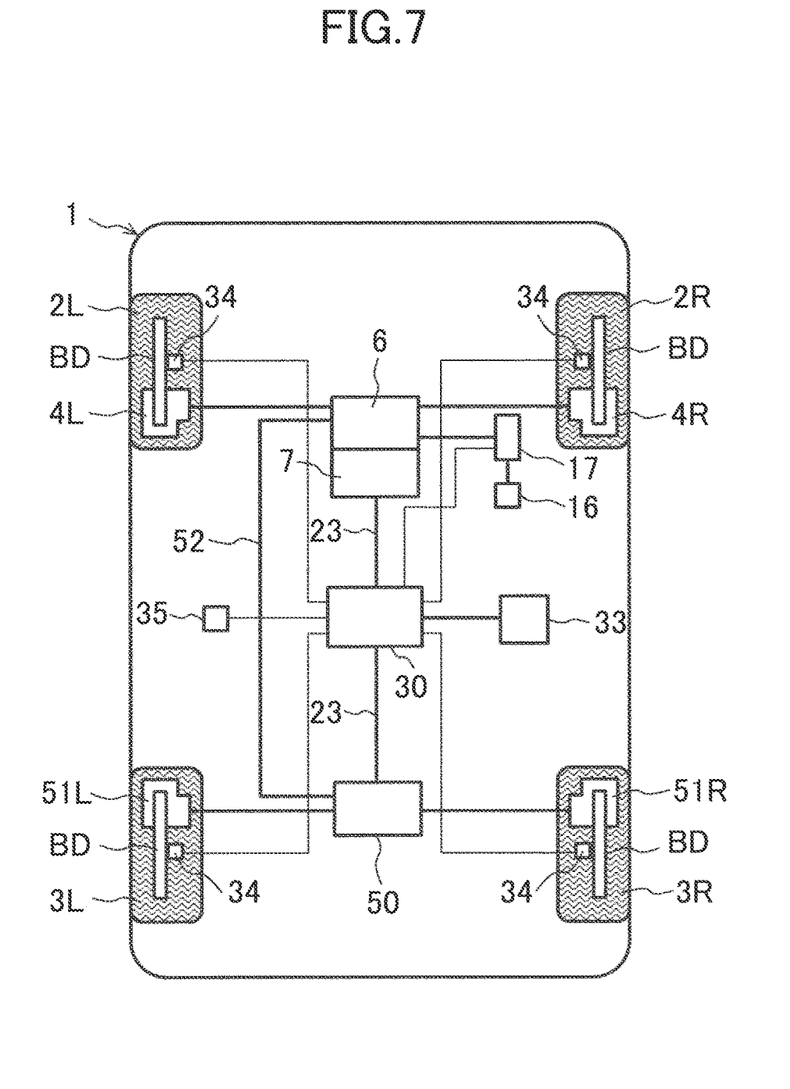
FIG. 7 is a figure depicting a modification example of FIG. 1.

In addition, whereas braking force is generated only at the front wheels by the hydraulic circuit system due to manipulation of the brake pedal 16 in the configuration depicted in the first embodiment, even in configuration, instead of the configuration above, in which braking force is generated at the front and rear wheels by the hydraulic circuit system due to manipulation of the brake pedal 16, advantages almost equivalent to those in the embodiment explained above can be obtained. The modification example is depicted in FIG. 7. FIG. 7 is a figure depicting a modification example of FIG. 1. FIG. 7 is different from FIG. 1 in that a rear-wheel electric hydraulic mechanism 50, hydraulic disc brakes 51R, and 51L on the rear wheel side, and a liquid pipe 52 connecting the front-wheel-side electric hydraulic mechanism 6, and the rear-wheel electric hydraulic mechanism 50 are included.

In the configuration in FIG. 7, the electric hydraulic mechanism is used to control braking force of the four front and rear wheels, and, in addition to this, braking force control of the rear wheels can be performed by the electric mechanism. For such a configuration also, in a case that the electric hydraulic mechanism malfunctions, the skid determination threshold according to the manipulation amount of the brake pedal 16 is set similarly to the one mentioned earlier. This makes it possible to perform control such that braking force by the electric mechanism is increased in a case that there is not brake pedal manipulation, and a skid of the rear wheels will not be significant in a case that there is brake pedal manipulation, and advantages almost equivalent to those in the embodiment explained above can be obtained.

Whereas the backup brake is provided on the front wheel side in the first embodiment, it may be provided on the rear wheel side. That is, the backup brake is provided to at least either the front wheels or the rear wheels, and it is sufficient if the second system (hydraulic circuit system) is actuated in accordance with a switch when the brake mechanism of the first system (electric hydraulic system) fails. Then, at the time of backup braking, the skid determination threshold for wheels (the front wheels or rear wheels) on the side where the backup brake is not actuated is set on the basis of braking force information about the backup braking.

Second Embodiment

Figure 8:
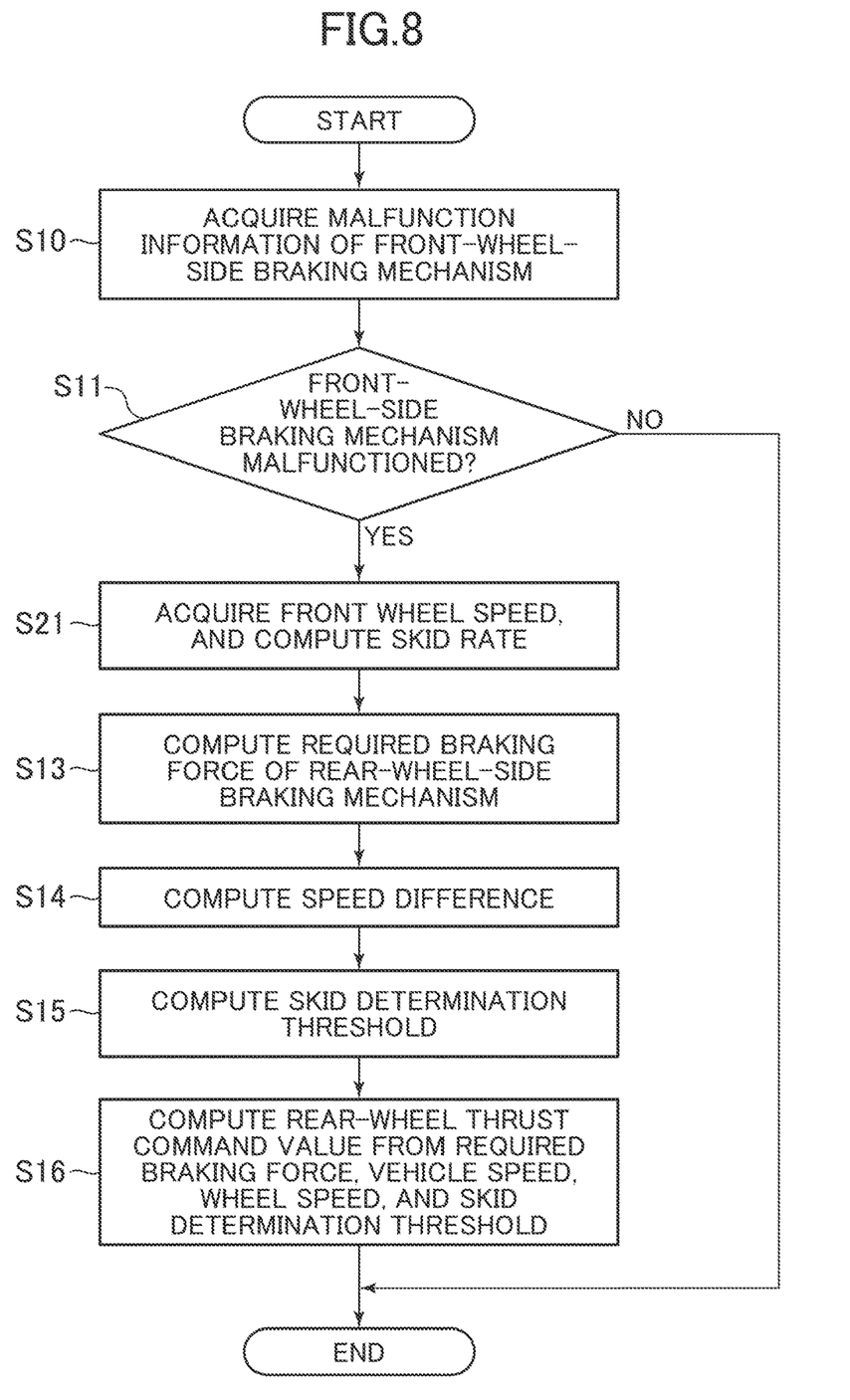
FIG. 8 is a flowchart depicting control executed by the brake control apparatus according to a second embodiment of the present invention.

Next, with reference to FIG. 8, a control method of the brake system of the vehicle according to a second embodiment of the present invention is explained. FIG. 8 is a flowchart depicting control executed by the brake control apparatus according to the second embodiment of the present invention, and is equivalent to a modification example of the first embodiment. Note that control steps with contents which are the same as their counterparts in the control steps of FIG. 6 are given the same reference numerals, and explanations thereof are omitted.

The control flow of the second embodiment depicted in FIG. 8 is different from that in the first embodiment in that Step S21 is added in place of Step S12 of the control flow depicted in FIG. 6. In the second embodiment, Step S21 is executed after it is determined at Step S11 that there is a malfunction.

[Step S21] At Step S21, the brake control apparatus 30 acquires a front wheel speed vf, and uses a vehicle speed V to determine a skid rate s=vf/V of the front wheels. Here, because there are two front wheels, the average of the two wheels or a lower wheel speed may be used as vf. Thereafter, the process proceeds to Step S13.

[Step S13] Next, at Step S13, on the basis of the skid rate s or the command value Ft of the superior control apparatus 33, the required braking force computing section 41 of the brake control apparatus 30 computes the required braking force Fr that the rear-wheel-side braking mechanism 5 is required to generate. Here, Fr is a value determined in accordance with a function like Fr=f1 (s) on the basis of the skid rate or computed in accordance with a function like Fr=f2 (Ft) on the basis of the command value of the superior control apparatus 33. Thereafter, the process proceeds to Step S14.

Whereas manipulation of the brake pedal 16 can be read by using a stroke sensor or the like in the first embodiment, the amount of backup brake manipulation by a driver may be read on the basis of the skid rate computed from the front wheel speed as in the second embodiment (FIG. 8), instead of information of a stroke sensor. That is, in the second embodiment, the backup brake manipulation amount (braking force information) is calculated on the basis of the skid rate computed from the vehicle speed, and the front wheel speed. After a malfunction of the front-wheel-side braking mechanism 4, an increase of the skid rate is attributable to actuation of the backup brake due to manipulation of the brake pedal 16 by the driver, if engine braking, and the like are excluded. Accordingly, even if the skid determination threshold for the rear wheel brakes is changed on the basis of the skid rate as in the second embodiment instead of the brake pedal manipulation amount in the first embodiment, it becomes possible to perform control such that braking force by the electric mechanism is increased in a case that there is not manipulation of the backup brake, and a skid of the rear wheels is suppressed in a case that there is manipulation of the backup brake, and advantages almost equivalent to those in the first embodiment explained above can be obtained.

Third Embodiment

Figure 9:
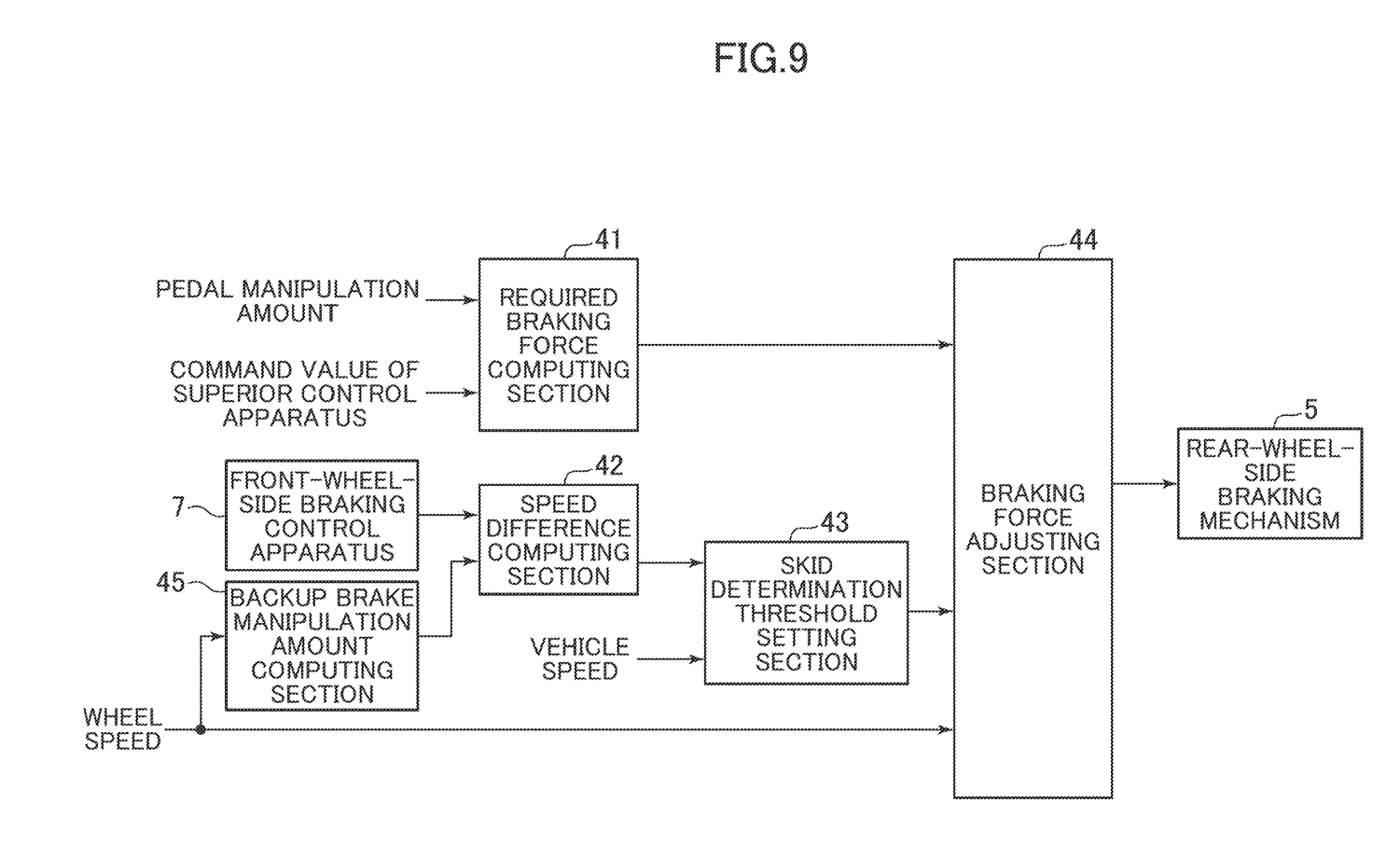
FIG. 9 is a block diagram depicting control executed by the brake control apparatus according to a third embodiment of the present invention.
Figure 10:
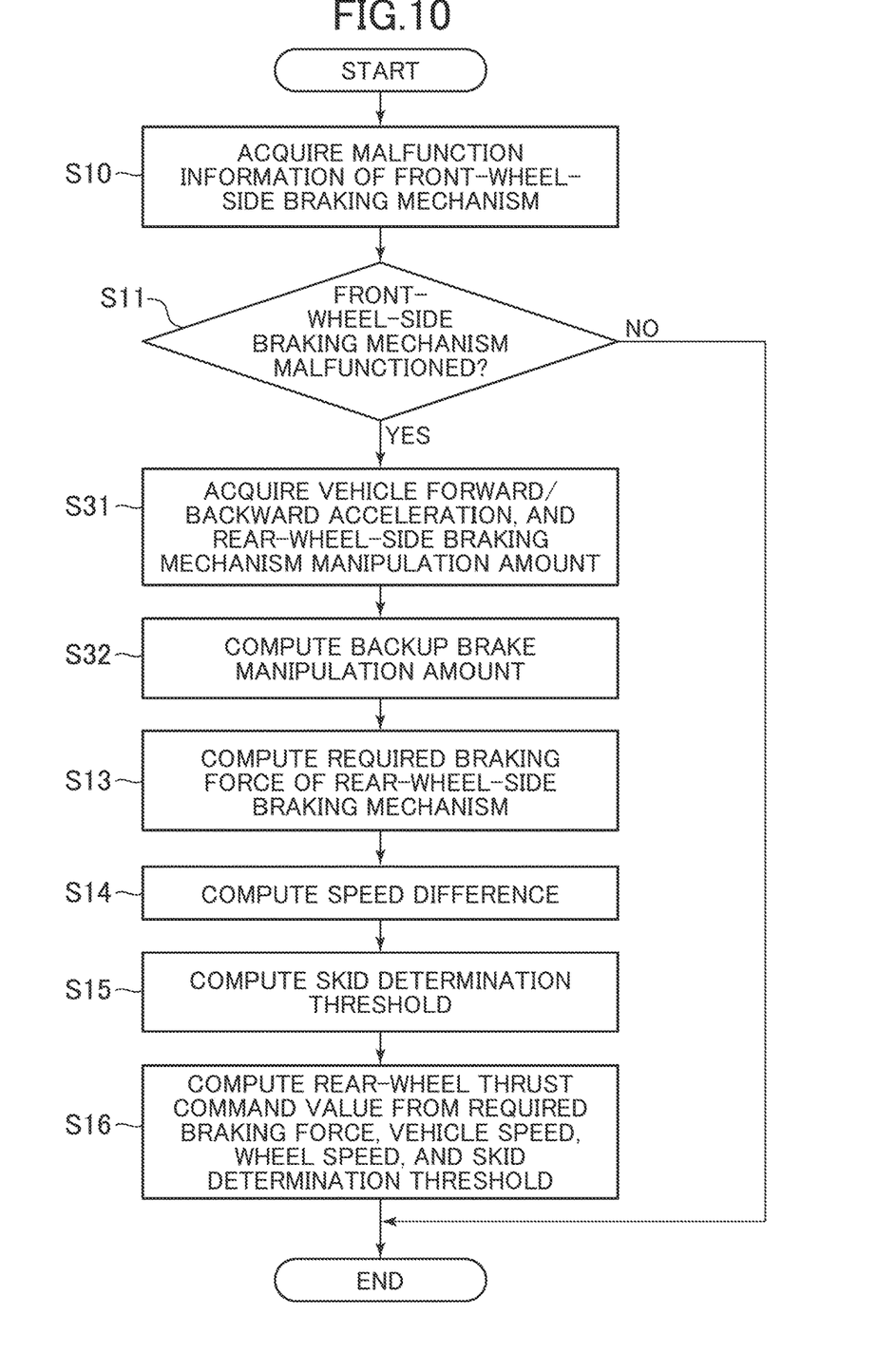
FIG. 10 is a flowchart depicting control executed by the brake control apparatus according to the third embodiment of the present invention.

Next, with reference to FIG. 9, and FIG. 10, a control method of the brake system of the vehicle according to a third embodiment of the present invention is explained. FIG. 9 is a block diagram depicting control executed by the brake control apparatus 30 according to the third embodiment of the present invention, and FIG. 10 is a flowchart depicting the control executed by the brake control apparatus according to the third embodiment of the present invention, and is equivalent to a modification example of the first embodiment. Note that control steps with contents which are the same as their counterparts in the control steps of FIG. 6 are given the same reference numerals, and explanations thereof are omitted.

The block diagram of the third embodiment depicted in FIG. 9 is different from the block diagram (FIG. 4) of the first embodiment in that a backup brake manipulation amount computing section 45 is added.

In addition, the control flow of the third embodiment depicted in FIG. 10 is different from that in the first embodiment in that Step S31, and Step S32 are added in place of Step S12 of the control flow depicted in FIG. 5. In the third embodiment, Step S31 is executed after it is determined at Step S11 that there is a malfunction.

[Step S31] At Step S31, the brake control apparatus 30 acquires a forward/backward acceleration Δv of the vehicle, and the braking force Fr being generated by the rear-wheel-side braking mechanism 5. The braking force Fr generated by the rear-wheel-side braking mechanism 5 is computed on the basis of manipulation amounts of the electric disc brakes 5R, and 5L. Next, the process proceeds to Step S32.

[Step S32] At Step S32, the backup brake manipulation amount computing section 45 of the brake control apparatus 30 computes a backup brake manipulation amount Fb from the forward/backward acceleration Δv of the vehicle, and the braking force Fr generated by the rear-wheel-side braking mechanism 5. For example, in a case that the body weight is defined as Mv, Fb may be computed in accordance with Fb=MvΔv−Fr.

Whereas manipulation of the brake pedal 16 can be read by using a stroke sensor or the like in the first embodiment, the amount of backup brake manipulation by a driver may be read on the basis of the skid rate determined from the front wheel speed as in the third embodiment, instead of information of a stroke sensor. After a malfunction of the front-wheel-side braking mechanism 4, an increase of the skid rate is attributable to actuation of the backup brake due to manipulation of the brake pedal 16 by the driver, if engine braking, and the like are excluded. Accordingly, even if the skid determination threshold for the rear wheel brakes is changed on the basis of the skid rate as in the third embodiment instead of the brake pedal manipulation amount in the first embodiment, it becomes possible to perform control such that braking force by the electric mechanism is increased in a case that there is not manipulation of the backup brake, and a skid of the rear wheels is suppressed in a case that there is manipulation of the backup brake, and advantages almost equivalent to those in the embodiments explained above can be obtained.

As explained above, according to embodiments of the present invention, in a vehicle having a backup brake functionality, and a control brake functionality enabling independent control of front and rear wheels, it is possible to perform control to obtain significant deceleration in a case that the backup brake is not being manipulated when the control brake functionality partially malfunctions, and to perform control to enhance the running stability in a case that the backup brake is being manipulated when the control brake functionality partially malfunctions. Thereby, it is possible to provide a brake control apparatus that can realize both significant deceleration, and maintenance of the running stability when the control brake functionality partially fails.

LIST OF REFERENCE SIGNS

1: Vehicle
2R, 2L: (Pair of) front wheels
3R, 3L: (Pair of) rear wheels
4: Front-wheel-side braking mechanism
4R, 4L: Hydraulic disc brake
5: Rear-wheel-side braking mechanism
5R, 5L: Electric disc brake
6: Front-wheel-side electric hydraulic mechanism
7: Front-wheel-side braking control apparatus
8: Electric motor for pump
9: Reservoir tank
10: Hydraulic pump
11: Electromagnetic pressure control valve
12R, 12L: Electromagnetic inflow valve
13R, 13L: Electromagnetic outflow valve
14: Electromagnetic shutoff valve
15: Hydraulic circuit system
16: Brake pedal
17: Master cylinder
18: Stroke simulator
19: Electromagnetic stroke simulator valve
20: Master cylinder pressure sensor
21: Pump pressure sensor
22R, 22L: Caliper pressure sensor
23: Control signal line
24: Rear-wheel-side electric mechanism
25R, 25L: Electric motor for braking
26: Brake pad
27: Rotation/linear motion conversion mechanism
29R, 29L: Thrust sensor
30: Brake control apparatus
33: Superior control apparatus
34: Wheel rotation speed sensor
35: Vehicle motion sensor
41: Required braking force computing section
42: Speed difference computing section
43: Skid determination threshold setting section
44: Braking force adjusting section
45: Backup brake manipulation amount computing section

The invention claimed is:

1. A brake control apparatus that controls braking force on front wheels, and rear wheels of a vehicle, the brake control apparatus comprising:
a backup brake that is provided to at least either the front wheels or the rear wheels, and is actuated in accordance with a switch to a second system when a brake mechanism of a first system fails; and
a skid determination threshold setting section that sets a skid determination threshold, wherein
when the backup brake is actuated, the skid determination threshold setting section sets the skid determination threshold on a basis of braking force information of the backup brake.

2. The brake control apparatus according to claim 1, wherein
the backup brake generates braking force in accordance with manipulation of a brake pedal, and
the skid determination threshold is set to a value that is smaller than a speed of the vehicle by a value corresponding to a manipulation amount of the brake pedal.

3. The brake control apparatus according to claim 1, wherein the skid determination threshold setting section sets the skid determination threshold such that a difference from a speed of the vehicle decreases as braking force generated by the backup brake increases.

4. The brake control apparatus according to claim 1, wherein when the brake mechanism of the first system at either the front wheels or the rear wheels fails while an automatic brake is actuated, the skid determination threshold setting section sets the skid determination threshold such that a difference from a speed of the vehicle becomes the largest in a case that the backup brake is not generating braking force, and sets the skid determination threshold such that the difference from the speed of the vehicle decreases in a case that the braking force is generated by the backup brake.

5. The brake control apparatus according to claim 1, wherein the skid determination threshold setting section sets the skid determination threshold such that a difference from a speed of the vehicle is larger in a case that the backup brake is not generating braking force as compared to a case that the backup brake is generating braking force.

6. The brake control apparatus according to claim 1, wherein a difference between a speed of the vehicle and the skid determination threshold for the front wheels or the rear wheels at a time point when lessening of braking force on the front wheels or the rear wheels is started decreases as braking force of the backup brake increases.

7. The brake control apparatus according to claim 1, wherein the backup brake applies braking force to either the front wheels or the rear wheels in accordance with treading force applied to a brake pedal by a driver.

8. The brake control apparatus according to claim 1, wherein the braking force information of the backup brake is calculated on a basis of a skid rate computed from a speed of the vehicle, and a speed of the front wheels or the rear wheels.

9. The brake control apparatus according to claim 1, comprising a backup brake manipulation amount computing section that computes a manipulation amount of the backup brake from a forward/backward acceleration of the vehicle, and braking force on the front wheels or the rear wheels.

10. A brake control apparatus that controls braking force on front wheels, and rear wheels of a vehicle, the brake control apparatus comprising:
a front-wheel-side braking mechanism that includes an electric hydraulic system, and a hydraulic circuit system, and applies braking force to the front wheels, and a rear-wheel-side braking mechanism that applies braking on a side of the rear wheels;

a backup brake that is actuated in accordance with a switch to the hydraulic circuit system when the electric hydraulic system fails, and applies braking force to the front wheel;
a skid determination threshold setting section that sets a skid determination threshold which is a value smaller than a speed of the vehicle; and
a braking force adjusting section that adjusts the braking force in accordance with the skid determination threshold, and a wheel speed of the vehicle, wherein
when the backup brake is actuated, the skid determination threshold setting section sets the skid determination threshold for the rear wheels on a basis of braking force information of the backup brake.

* * * * *